United States Patent [19]
Swaminathan et al.

[11] Patent Number: 5,717,712
[45] Date of Patent: Feb. 10, 1998

[54] LASER COMMUNICATION SYSTEM WITH TEMPERATURE CONTROLLED

[75] Inventors: Venkataraman Swaminathan, Macungie, Pa.; Sheryl L. Woodward, Lincroft, N.J.; George E. Bodeep, DeKalb County, Ga.

[73] Assignee: Lucent Technologies Inc., Murray Hill, N.J.

[21] Appl. No.: 527,240

[22] Filed: Sep. 12, 1995

[51] Int. Cl.⁶ .................................................. H01S 3/08

[52] U.S. Cl. .................. 372/107; 372/34; 372/69; 372/33; 372/38; 372/96

[58] Field of Search ..................... 372/36, 34, 38, 372/92, 33, 96

[56] References Cited

U.S. PATENT DOCUMENTS

| | | | |
|---|---|---|---|
| 5,214,660 | 5/1993 | Masuko et al. | 372/34 |
| 5,247,530 | 9/1993 | Shigeno et al. | 372/36 |
| 5,394,430 | 2/1995 | Huang | 372/103 |
| 5,438,579 | 8/1995 | Eda et al. | 372/34 |
| 5,602,860 | 2/1997 | Masonson | 372/34 |

Primary Examiner—Leon Scott, Jr.

[57] ABSTRACT

A temperature controlled mounting package for a fiber optic communication laser, mounted within an adapter, which is in thermal contact with a heat exchange element. The heat exchange element may be a thermoelectric cooling element or a resistance heater which maintains the laser within a temperature band. By keeping the temperature bandwidth to 40 degrees Centigrade, the signal variations are held to within 1 dB in fiber-optic applications.

33 Claims, 2 Drawing Sheets

LASER COMMUNICATION SYSTEM WITH TEMPERATURE CONTROLLED

BACKGROUND OF THE INVENTION

1. Field of the Invention

This invention relates to optical communication fiber transmission systems employing a sub-carrier multiplexed format, and in particular to systems wherein the optical transmitter is temperature controlled.

2. Description of Related Art

The concept of an information highway is now developing into hardware which will provide wide bandwidth service to every home and office in the telephone loop plant. The location of this hardware places environmental burdens upon the laser transmitters, particularly with respect to their operating temperature and its effect upon error free operation. Equipment enclosures in the loop plant can easily reach inside temperatures of 85 degrees Centigrade due to internal power dissipation and external solar heating. Reducing cost is another factor to ensure the universal acceptance of wide-bandwidth systems.

A variety of laser transmitters have been developed which direct a modulated beam into an optical fiber. One method of modulating the laser beam with radio frequency subcarriers is called Quadrature Phase Shift Keying. This method has been applied to Fabry-Perot and distributed feedback lasers. These lasers are sensitive to operating temperature variations. For example, the electro-optical characteristics of the lasers such as threshold current, differential quantum efficiency, and wavelength as a function of temperature. Distributed feedback (DFB) lasers may improve system performance because they operate with lower relative intensity noise (RIN). These DFB lasers are further sensitive to operating temperature variations. The mechanism is that increasing the temperature broadens the optical spectrum of the laser output with respect to its Bragg angle wavelength, 1.3 microns in this case, and the spectrum peak is also shifted.

Laser packages have been developed with internal cooling, that is, the laser is mounted on a sub-mount—which is then mounted to a thermoelectric cooling element. The optical fiber is then aligned to the laser chip. The inclusion of the cooling element to the laser chip increases the price of these packages, not only because of the cost of the cooling element—but also because of the added difficulty of aligning the optical fiber. This laser package can hold the operating temperature of the laser to within 0.1 degree C. of the desired temperature.

Accordingly, there is an increased need in the art for an inexpensive laser package which provides reliable, error-free operation over a range of temperatures which are to be encountered in the loop plant which do not require temperature control to within plus or minus 1 degree C.

SUMMARY OF THE INVENTION

The present invention relates to the external cooling of lasers in subcarrier multiplexed systems.

In one embodiment of the invention, RF signals on coaxial cables emanating from subscribers are multiplexed at a laser node in the loop plant onto an optical beam whose wavelength is 1.3 microns. The optical signal is then transmitted through an optical fiber to a central office where the requirements are that incoming signals be within plus or minus one dB of each other. Temperature variations in the laser node may range from minus 10 degrees C. to 85 degrees C., which cause amplitude variations in the output of a laser which are beyond specification.

A simple laser package with external cooling, typically by a thermoelectric element, keeps the laser below a temperature which would cause excessive signal variation. A cost saving, compared to providing thermoelectric cooling directly within the laser package provides a cost reduction. If the temperature is maintained above the dew point, say above 25 degrees C., then the thermoelectric cooler need not be hermetically sealed, further reducing the cost.

In another embodiment of the invention, a resistance heater keeps the operating temperature of the laser within a temperature band that keeps the laser output within specified limits. By suitably modifying the fabrication procedures (e.g. the pitch of the distributed feedback laser's grating), lasers can be made which have acceptable performance in the 40 degree C. to 80 degree C. temperature band.

These and other features and advantages of the invention will be better understood with consideration of the following detailed description of the preferred embodiments taken in conjunction with the accompanying drawings.

The drawings are not to scale.

DETAILED DESCRIPTION OF THE PREFERRED EMBODIMENTS

The distribution of wideband communications facilities to provide universal service to homes and small offices in the telephone loop plant may be accomplished with a Hybrid Fiber Coaxial System known as HFC 2000™. In this system the subscriber communicates information through a coaxial cable to a laser node, where many such coaxial channels are multiplexed onto a laser driven optical fiber which is connected to a central office.

The laser node is not in a controlled environment, and therefore may experience great ambient temperature variations depending upon whether it is in a manhole or pole mounted. A temperature variation from −10 degrees C. to +85 degrees C. is expected. The output of the lasers in these nodes is balanced to have their signals arrive at the central office within plus or minus 1 dB of each other. Once balanced, the output level of the lasers must be stable with the temperature variations to maintain the performance specification.

To promote universal service, these lasers must also be provided at relatively low cost. Laser packages can be made with integral thermoelectric cooling elements, but they are a factor of three to five times more expensive than the apparatus described in the present invention.

Figure 1:
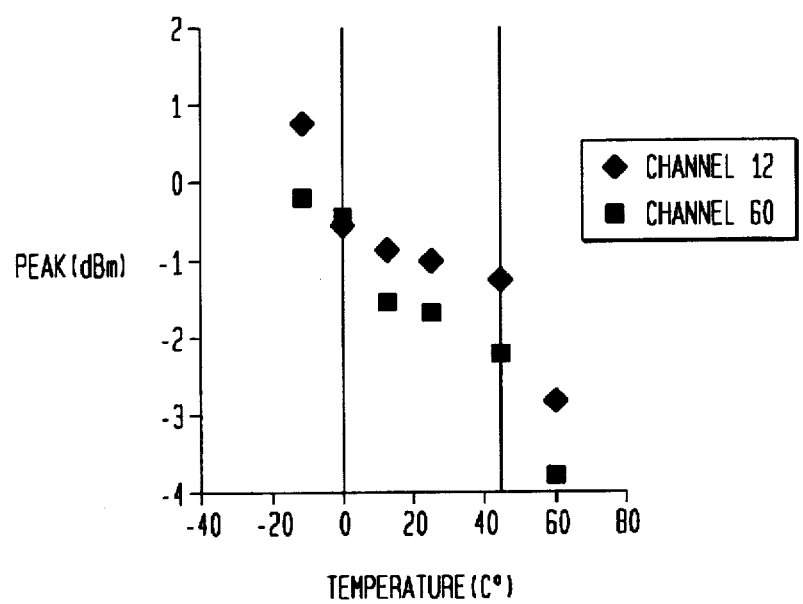
FIG. 1 is a graph showing the peak RF output of an uncooled distributed feedback laser versus temperature.

Referring now to FIG. 1, there is shown the peak output signal on two channels of an uncooled distributed feedback laser versus temperature. The laser was maintained at each temperature in an oven and the laser bias was adjusted to keep the backface monitor current constant so that a two milliwatt beam was emitted into an optical fiber. A distributed feedback laser is preferred over a Fabry-Perot laser because it operates with lower relative intensity noise.

However, the distributed feedback laser is more sensitive to temperature variations than the other laser. Many other operating parameters were measured including carrier to noise ratio, composite second order level, composite triple beat level, peak RF signal, noise floor, and bit error rate. The result was that the uncooled distributed feedback lasers have adequate performance except for the signal variations with temperature shown in FIG. 1. The peak signal variations can be kept within specifications if the operating temperature of the laser is kept within zero degrees C. to 40 degrees C., or another temperature band which is no more than 40 degrees C. wide. This permits the use of cheaper uncooled lasers which may require only minimal external cooling or heating for a hybrid fiber cable application.

Figure 2:
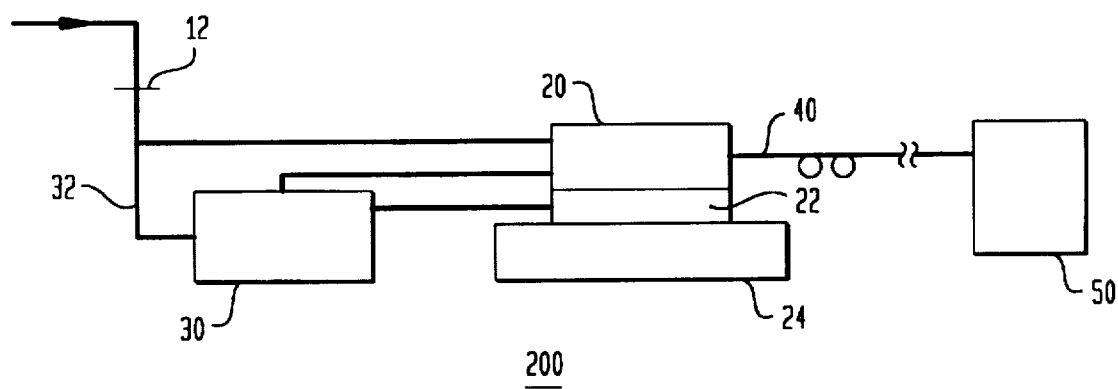
FIG. 2 shows a block diagram of a lightwave transmission system.

Referring now to FIG. 2, there is shown a lightwave transmission system 200 carrying information to a central office in which the RF portion of the signal is passed through capacitor 12 and combined with a prebias signal on lead 32 to enter laser 20, the output of which enters optical fiber 40 which is connected to receiver 50. The laser chip has a backface monitor 22. The current from the backface monitor is used to control the laser pre-bias current using a feedback loop 30. The laser package is also in thermal contact with temperature controller 24 and temperature sensor 25. The temperature controller uses the signal from the sensor to hold the laser temperature within a 40 degree C. temperature band. This coarse temperature control maintains a signal level within specifications for an inexpensive laser package. Typically, the temperature range is from zero degrees C. to 40 degrees C. As the temperature rises, the threshold current and slope efficiency vary. The backface monitor current can be used to control the laser's DC bias so that the average optical output power is held constant. However, the monitor is not fast enough to measure the level of AC signals, so it can not correct for variations in the peak signal level caused by changes in the laser's slope efficiency. Therefore, the uncooled packaged laser is placed on a cooler.

Figure 3:
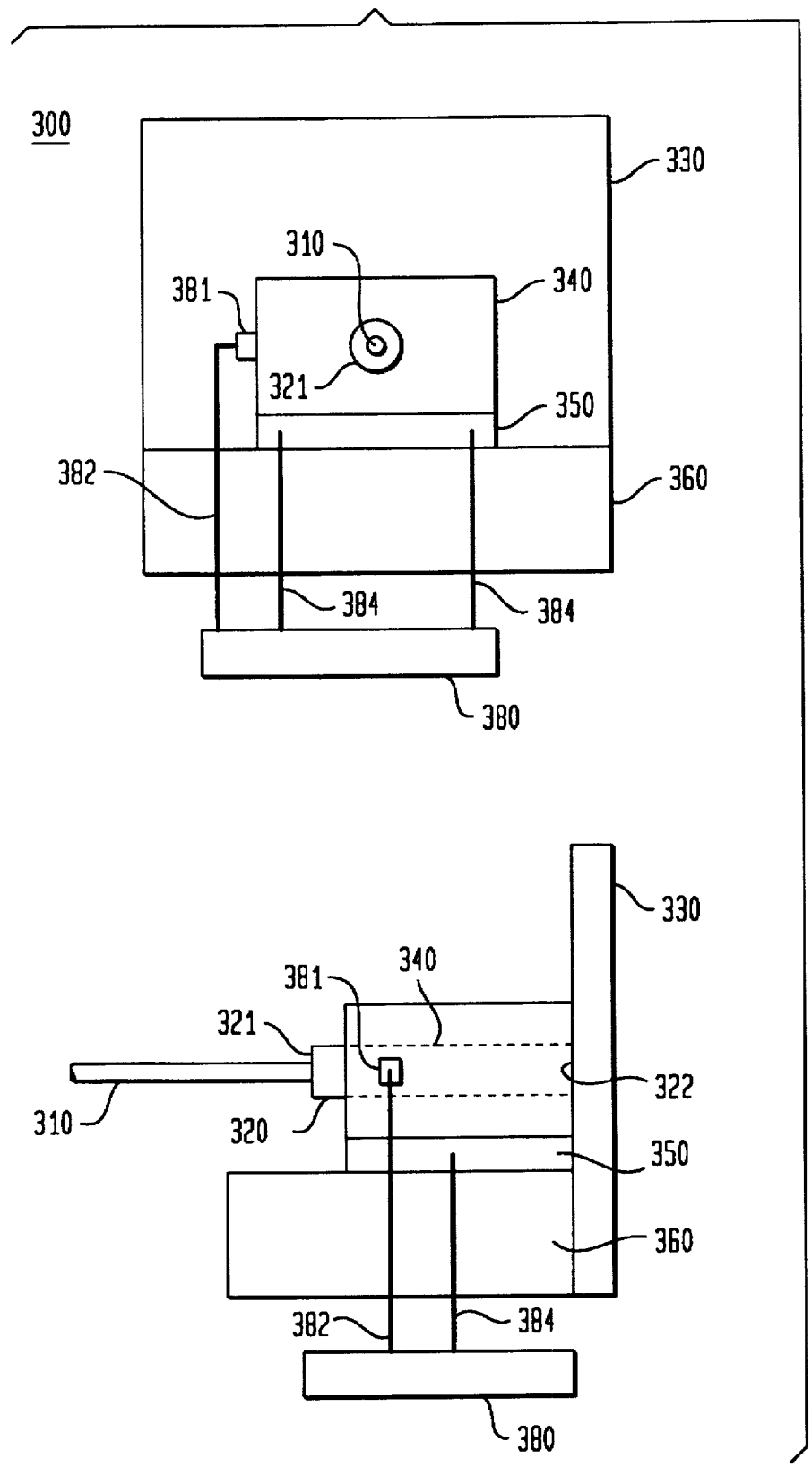
FIG. 3 shows front and side views of an externally cooled laser package which is employed in the lightwave transmission system of FIG. 2.

Referring now to FIG. 3, there is shown a front and side view of apparatus 300 which is an externally cooled laser package in accordance with the invention. Mounting block 360 supports heat exchange element 350 and printed wiring board 330. The heat exchange element is typically a thermoelectric cooler operating by the Peltier effect wherein heat is absorbed at one junction and emitted at the other junction, when current is passed through two junctions of dissimilar metals. However, heat exchange element may also be a heating element, made from a resistive material such as nichrome alloy or a cermet material, in cases where the laser is designed to operate at temperatures which are higher than the ambient temperature around the laser transmitter.

Adapter 340 is in thermal and mechanical contact with heat exchange element 350, and it is also in thermal and mechanical contact with optical transmitter 320. The front face 321 of the optical transmitter directs a modulated optical signal into fiber optic cable 310. The printed wiring board is connected to (not shown) multiplexed RF signals, power, ground, and DC bias signals which are directed to the optical transmitter 320 at its rear face 322. Sensor lead 382 is connected to a sensor 381 on the adapter which measures its temperature. The sensor may be a thermistor or a thermocouple. Sensor lead 382 is also connected to cooler controller 380 which is adapted to drive a current through leads 384 to the heat exchange element which is in contact with the adapter.

The advantage of this configuration is that the laser in optical transmitter 320 is less expensive than the same laser would be if packaged with integral cooling. This cost savings is multiplied many thousands of times in the collection of broadband signals from subscribers to laser nodes in the loop plant and eventually to a central office. Further, temperature controller 24 of FIG. 2 needs only to hold the laser to a temperature below 40 degrees C. to stay within the specified signal variation of plus or minus 1 dB as shown in the data presented in FIG. 1. If the temperature is maintained above the dew point, say above 25 degrees C., then the thermoelectric cooler need not be hermetically sealed, further reducing the cost. Alternatively, another 40 degree C. wide temperature band may be selected and the heat exchange element could be a resistance heater. By changing the fabrication procedures such as the pitch of the distributed feedback laser's grating, lasers can be made which have acceptable performance in the 40 degree C. to 80 degree C. temperature band.

Changes and modifications in the specifically described embodiments can be carried out without departing from the scope of the invention. In particular, a variety of cooling elements such as liquid cooling elements would perform the same function without departing from the spirit of the invention. The optical communications system may also have optical, rather than coaxial inputs, or the outputs of a hybrid system may be coaxial cables. The laser transmitter may contain any type of communication light source such as a Fabry-Perot laser or a DFB laser.

We claim:

1. Apparatus for mounting an optical transmitter module comprising:

an adapter for holding a removable and replaceable optical transmitter module, said adapter being in thermal and mechanical contact with the removable and replaceable optical transmitter module;

a heat exchange thermally and mechanically connected to the adapter; and a mounting block for supporting the heat exchange element, wherein optical alignment of the apparatus and the removable and replaceable optical transmitter module are unaffected by replacement of the removable and replaceable optical transmitter module in said adapter to thereby produce a mechanically and optically stable laser package.

2. The apparatus of claim 1 further comprising a sensor, mounted on the adapter, said sensor monitoring a temperature of the adapter and generating a signal in response to said temperature.

3. The apparatus of claim 2 further comprising a temperature controller for receiving said signal from the sensor, said temperature controller being responsive to said signal by providing a current to the heat exchange element, whereby the temperature of the adapter is controlled and is held within a given temperature range.

4. The apparatus of claim 1 wherein the heat exchange element is a Pelter effect thermoelectric cooling element.

5. The apparatus of claim 1 wherein the heat exchange element is resistance heating element.

6. The apparatus of claim 3, wherein the said given temperature range of the adapter a 40 degree Centigrade band.

7. The apparatus of claim 1 wherein the optical transmitter is a laser.

8. The apparatus of claim 7 wherein the optical transmitter is a distributed feedback laser.

9. The apparatus of claim 7 wherein the optical transmitter is a Fabry-Perot laser.

10. The apparatus of claim 1 further comprising a printed wiring board adapted to provide power, ground, and electrical signals to the optical transmitter.

11. Apparatus for the mounting of a laser module comprising:
- an adapter for holding a removable and replaceable laser module, said adapter being in thermal and mechanical contact with the removable and replaceable laser module;
- a heat exchange element thermally and mechanically connected to the adapter;
- a mounting block for supporting the heat exchange element; and
- a sensor, mounted on the adapter, said sensor monitoring a temperature of the adapter and generating a signal in response to said temperature, wherein optical alignment of the apparatus and the removable and replaceable laser module are unaffected by replacement of the removable and replaceable laser module in said adapter to thereby produce a mechanically and optically stable laser package.

12. The apparatus of claim 11 wherein the laser is a distributed feedback laser.

13. The apparatus of claim 11 wherein the laser is a Fabry-Perot laser.

14. The apparatus of claim 11 further comprising a temperature controller for receiving said signal from the sensor, said temperature controller being responsive to said signal providing a current to the heat exchange element, whereby the temperature of the adapter is controlled and is held within a given temperature range.

15. The apparatus of claim 14 wherein the given temperature range of the adapter is a 40 degree Centigrade band.

16. The apparatus of claim 11 wherein the heat exchange element is a Peltier effect thermoelectric cooling element.

17. The apparatus of claim 11 wherein the heat exchange element is resistance heating element.

18. A hybrid fiber coaxial cable communications system having an optical fiber, said optical fiber coupling coaxial cable subscribers to a central office, said system comprising:
- a removable and replaceable distributed feedback laser module;
- coaxial signal leads connected to the removable and replaceable distributed feedback laser module;
- an adapter for holding the removable and replaceable distributed feedback laser module, said adapter being in thermal and mechanical contact with the removable and replaceable distributed feedback laser module;
- a mounting block supporting the adapter; and
- a heat exchange element thermally and mechanically connected to the adapter.

wherein optical alignment of said system and the removable and replaceable distributed feedback laser module are unaffected by replacement of the removable and replaceable distributed feedback laser module in said adapter to thereby produce a mechanically and optically stable laser package.

19. The apparatus of claim 18 wherein the laser is a distributed feedback laser.

20. The apparatus of claim 18 wherein the laser is a Fabry-Perot laser.

21. The communications system of claim 18 wherein the heat exchange element is a Peltier effect thermoelectric cooling element.

22. The apparatus of claim 18 wherein the heat exchange element is resistance heating element.

23. The apparatus of claim 18 further comprising a sensor, mounted on the adapter, said sensor monitoring a temperature of the adapter and generating a signal in response to said temperature.

24. The apparatus of claim 23 further comprising a temperature controller for receiving said signal from the sensor, said temperature controller being responsive to said signal providing a current to the heat exchange element, whereby the temperature of the adapter is controlled and is held within a given temperature range.

25. The apparatus of claim 24 wherein the temperature range of the adapter is a 40 degree Centigrade band.

26. A sub-carrier multiplexed hybrid fiber coaxial cable communications system having an optical fiber, said optical fiber coupling coaxial cable subscribers to a central office, said system comprising:
- a removable and replaceable laser module whose output is coupled to an optical fiber;
- coaxial signal leads connected to the removable module and replaceable laser;
- an adapter for holding the removable and replaceable laser, said adapter being in thermal and mechanical contact with the removable and replaceable laser;
- a mounting block supporting the adapter; and
- a heat exchange element thermally and mechanically connected to the adapter, wherein optical alignment of said system and the removable and replaceable laser module are unaffected by replacement of the removable laser module in said adapter to thereby produce a mechanically and optically stable laser package.

27. The apparatus of claim 26 wherein the laser is a distributed feedback laser.

28. The apparatus of claim 26 wherein the laser is a Fabry-Perot laser.

29. The communications system of claim 26 wherein the heat exchange element is a Peltier effect thermoelectric cooling element.

30. The apparatus of claim 26 wherein the heat exchange element is resistance heating element.

31. The apparatus of claim 26 further comprising a sensor, mounted on the adapter, said sensor monitoring a temperature of the adapter and generating a signal in response to said temperature.

32. The apparatus of claim 31 further comprising a temperature controller for receiving said signal from the sensor said temperature controller being responsive to said signal by providing a current to the heat exchange element, whereby the temperature of the adapter is controlled and is held within a given temperature range.

33. The apparatus of claim 32 wherein the given temperature range of the adapter is a 40 degree Centigrade band.

* * * * *